United States Patent

[11] 3,603,819

[72] Inventor Nicolaas Johannes Maria Molle
Nijmegen, Netherlands
[21] Appl. No. 812,616
[22] Filed Apr. 2, 1969
[45] Patented Sept. 7, 1971
[73] Assignee U.S. Philips Corporation
New York, N.Y.
[32] Priority Apr. 9, 1968
[33] Netherlands
[31] 6,805,036

[54] JK-FLIP-FLOP
5 Claims, 3 Drawing Figs.

[52] U.S. Cl. ........................................................ 307/291,
307/215, 307/239, 307/269, 328/195, 328/196
[51] Int. Cl. ........................................................ H03k 3/12,
H03k 3/286
[50] Field of Search ........................................... 307/289,
291, 292, 293, 238, 239; 328/195, 196, 206;
331/50, 51, 52

[56] References Cited

UNITED STATES PATENTS

| | | | |
|---|---|---|---|
| 3,440,449 | 4/1969 | Priel et al. .................... | 307/291 |
| 3,467,839 | 9/1969 | Miller .......................... | 328/206 X |
| 3,510,784 | 5/1970 | Weber .......................... | 328/196 X |

*Primary Examiner*—Donald D. Forrer
*Assistant Examiner*—L. N. Anagnos
*Attorney*—Frank R. Trifari

ABSTRACT: A JK-flip-flop of the master-slave type wherein the output signals from the slave flip-flop are each fed back to a separate input gate each consisting of separate partial gates. The J and K signals are both fed to each of the input gates whereby changes in the J and K signals occurring during a clock pulse are registered in the slave flip-flop.

Figure 1:
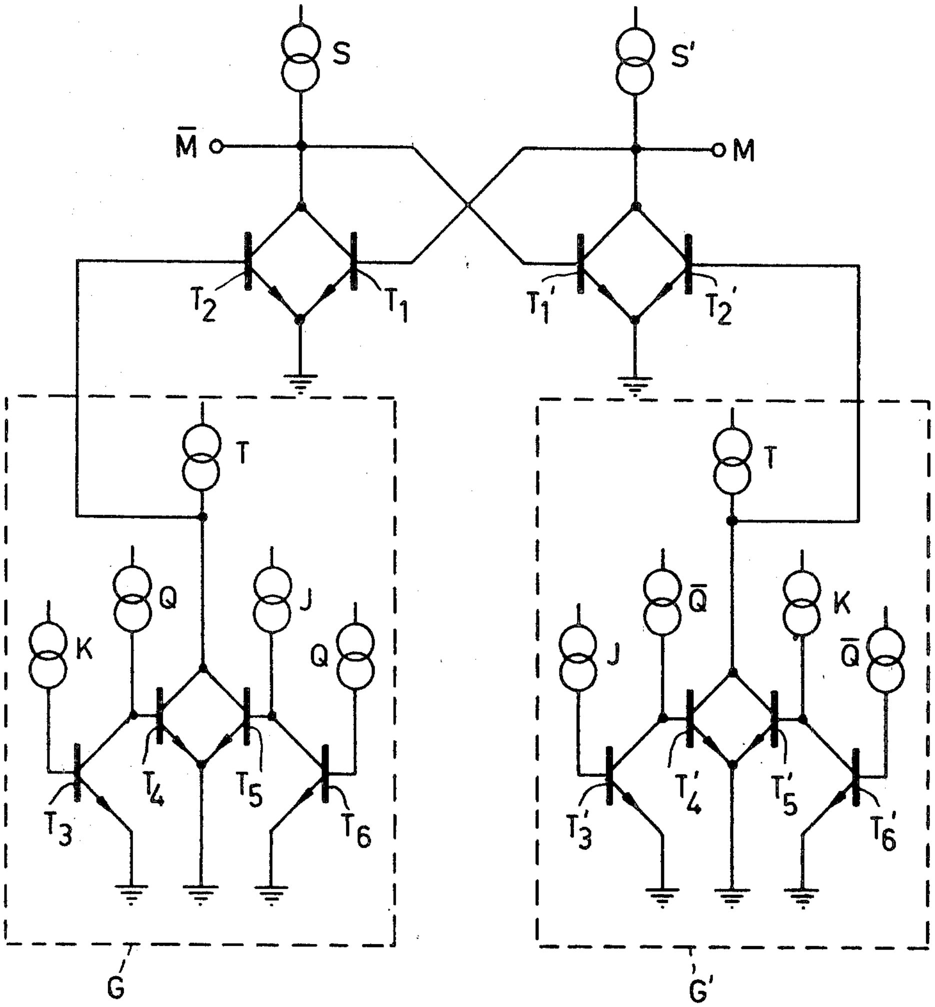

INVENTOR.
NICOLAAS J.M.MOLLE
BY
AGENT

INVENTOR.
NICOLAAS J.M.MOLLE
BY
Frank R. Trifari
AGENT

INVENTOR.
NICOLAAS J.M.MOLLE
BY
Frank R. Trifari
AGENT

JK-FLIP-FLOP

The invention relates to a JK-flip-flop the master-slave type, in which the master flip-flop is connected on the one hand to a first gate circuit to which are applied the clock signal T, the K-signal and the output signal Q, and on the other hand to a second gate circuit to which are applied the clock signal T, the J-signal and the inverse output signal $\overline{Q}$ of the slave flip-flop, while the output of the master flip-flop is connected through gate circuits controlled by the clock signal T to the slave flip-flop.

Such Flip-flops are commercially available. Their operation has been described inter alia by Lagemann in "Elektronische Rechemanlagen" 1967, volume 1, pages 9–16, (cf. in particular the description with reference to FIG. 3*d* on page 10 and with reference to FIG. 5*a* and *b* on page 11). Flip-flops of this type have the advantage of a convenient construction and a suitably small number of circuit elements.

A few known flip-flops of the kind set forth are provided with capacitive elements having a certain storage or delay effect. Such elements have the disadvantage that the flip-flop becomes sensitive to the flank steepness of the signals applied to them, which is generally undesirable. Other known flip-flops have the disadvantage that the J- and K-information must be present from the instant at which the clock signal varies so that this information is read in the flip-flop, since in certain cases variation of this information is no longer read in, whereas it is read in other cases in which it is undesirable, for example, when interference signals occur, which results in that in these cases, the starting condition which is obtained after the clock signal has returned to the original state no longer corresponds to the last information available.

The invention has for an object to mitigate the said disadvantages and is characterized in that in addition the J-signal is applied to the first gate circuit and the K-signal is applied to the second gate circuit, which gate circuits are constructed and controlled by the said signals in such a manner that from the instant at which connections are established by the clock signal between each of the J- and K-inputs and the master-flip-flop through the gate circuits till the instant at which the clock signal T has returned to its original state and at which these connections are interrupted, upon any variation of the J- and K-information the new information is read in the master flip-flop.

A further development of the principle according to the invention is characterized in that the first and the second gate circuits are each built up of two partial gates of the J- and the Q-signal being applied to one of the partial gates of the first gate circuit and the K- and the Q-signal to the other partial gate of the first gate circuit, while the K- and the $\overline{Q}$-signal are applied to one of the partial gates of the se cone gate circuit and the J- and the $\overline{Q}$-signal to the other partial gate of the second gate circuit in such a sense that, when the two gate circuits are connected by the T-signal to the master flip-flop, the first gate circuit supplies a 0 to one end of the master flip-flop and the second gate circuit a 1 to the other end of the master flip-flop if either the K-signal is 0 and the Q-signal is 1 or the J-signal is 0 and the Q -signal is O, while the second gate circuit supplies a O to the latter end of the master flip-flop and the first gate circuit a 1 to the former end of the master flip-flop if either the J-signal is O and the $\overline{Q}$-signal is 1 or the K-signal is 1 and the $\overline{Q}$-signal is O.

The invention is based on recognition of the fact that during one phase of the clock period the master flip-flop is constantly open to receive J- and K-information, respectively, while upon variation of the phase of the clock period, the slave flip-flop takes over the state last occupied by the master flip-flop. This permits of operating with very rapid and, as the case may be, symmetrical clock pulses, which results in a saving of time. Moreover, the influence of interference signals on the J- and K-inputs is neutralized as long as the clock signal ensures that the master flip-flop is open to receive J- and K-information because after the disappearance of the interference signal the original state is restored. Furthermore, the circuit arrangement responds independently of the flank steepness of the pulses applied.

Figure 2:
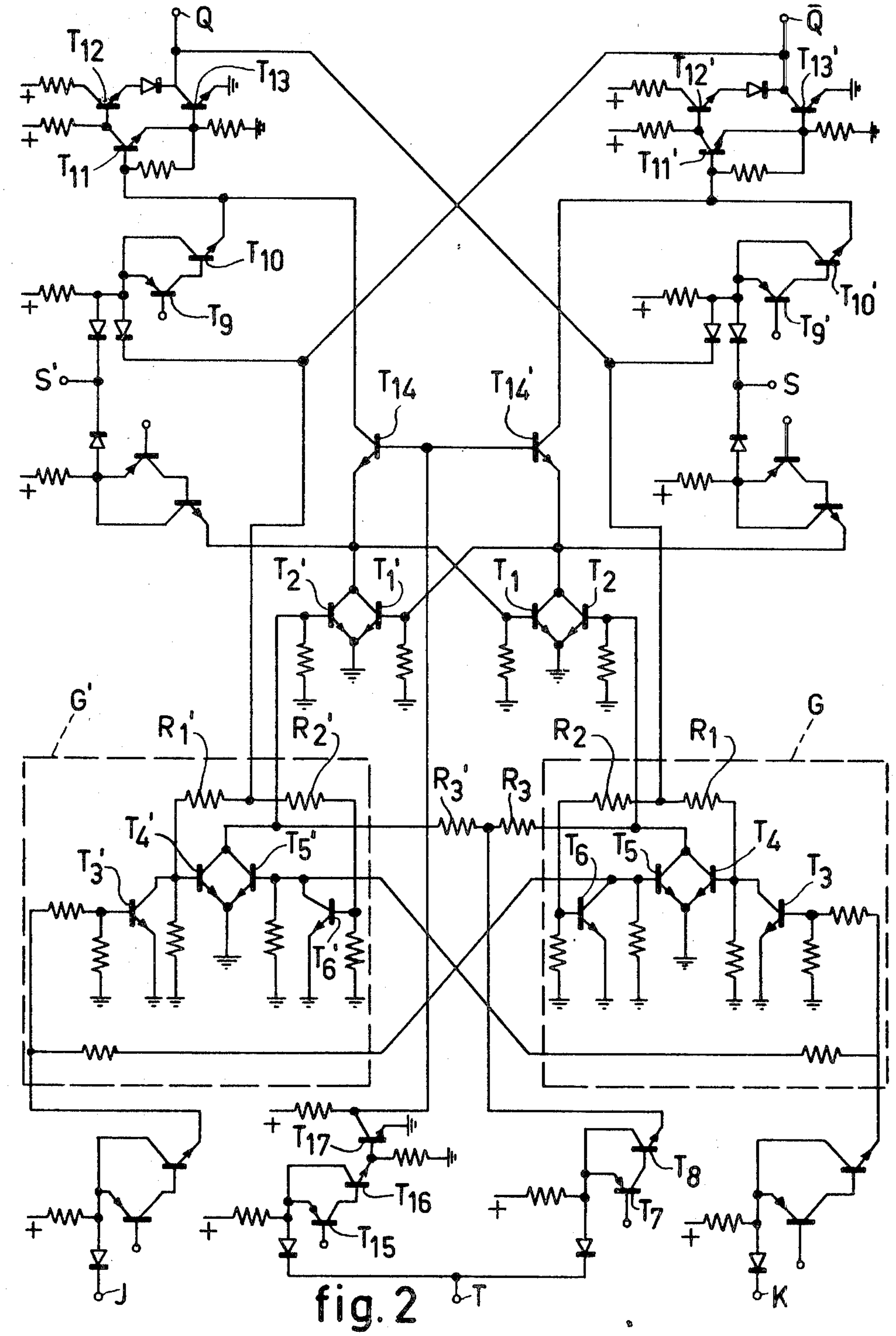
Figure 3:
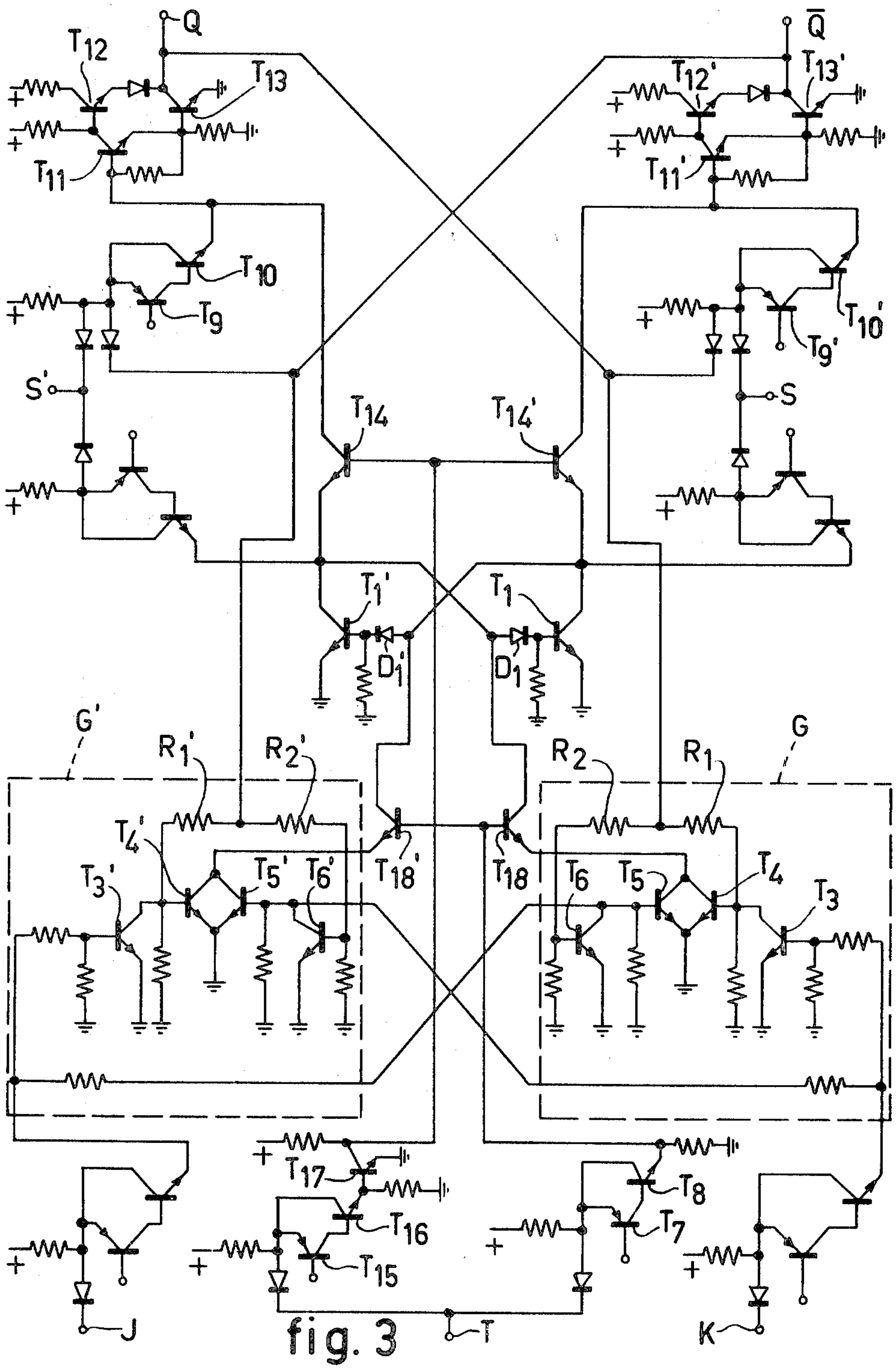

The invention will now be described more fully with reference to the drawing, in which:

FIG. 1 shown diagrammatically the part of a JK-flip-flop to which the principle of the invention is applied, FIG. 2 shows an embodiment according to the invention, and FIG. 3 shows as alternative embodiment of the invention.

FIG. 1 shows a basic circuit diagram of the input part inclusive of the master flip-flop of a JK-flip-flop according to the invention. The master flip-flop comprises (NPN)-transistors $T_1$ and $T_1'$ are connected by cross-coupling (Eccles-Jordon circuit) as a bistable flip-flop. The emitter-collector -collector paths of the transistors $T_1$ and $T_1'$ are shunted by those of the (NPN)-transistors 85 $T_2$ and $T_2$, respectively, to the bases of which are applied control signals for the master flip-flop. Supply current sources at the collectors of the transistors $T_1$, $T_1'$, $T_2$ and $T_2'$, respectively, can be interrupted by means of set pulses S and S' respectively.

The said control signals are obtained from gate circuits G and G', respectively, which according to the invention are each built up of two partial gates. One partial gate of the gate circuit G comprises the (NPN)-transistors $T_3$–$T_4$ and the other partial gate the (NPN)-transistors $T_5$–$T_6$. In an analogous manner, the transistors $T_3'$–$T_4'$ and $T_5'$–$T_6'$, respectively, constitute partial gates of the gate circuit G'. The signals applied to the partial gates are represented as current sources, the arithmetical 1-state of the signals corresponding to the presence and the arithmetical 0-state to the absence of current.

The K-signal is applied to the base of the transistor $T_3$ whose collector-emitter path is connected in parallel with the base-emitter path of the transistor $T_4$. The output signal Q of the slave flip-flop (not shown) is applied to the base of the latter transistor. This signal Q is also applied to the base of the transistor $T_6$ whose collector-emitter path is connected in parallel with the base-emitter path of the transistor $T_5$, to the base of which the J-signal is applied.

The transistors $T_3'$, $T_4'$, $T_5'$ and $T_6'$ are connected in a similar manner as the transistors $T_3$, $T_4$, $T_5$, $T_6$ on the understanding that in this case the J-signal is applied to the base of the transistor $T_3'$, the K-signal to the base of the transistor $T_5'$ and the inverse output signal $\overline{Q}$ of the slave flip-flop to the bases of the transistors $T_4'$ and $T_6'$.

The collector-emitter paths of the transistors $T_4$, $T_5$ and $T_4'$, $T_5'$, respectively, are connected in parallel with each other. Their collectors are connected to the bases of the transistors $T_2$ and $T_2'$, respectively, and current sources are operative at their collectors which can be interrupted by the clock signal T.

The part of the circuit arrangement comprising the transistor $T_3$ and the current sources K and Q connected thereto constitutes an AND gate for the Q- and the inverted K-signal. The transistor $T_6$ fulfills this function for the J- and the inverted Q-signal, the transistor $T_3'$ for the $\overline{Q}$- and the inverted J-signal and the transistor $T_6'$ for the K- and the inverted $\overline{Q}$-signal. The transistors $T_4$, $T_5$ and $T_4'$, $T_5'$, respectively, constitute gates for the base signals applied thereto.

The operation of conventional JK-flip-flops is such that during one state or phase of the clock signal T variations of the J- and K-signals supplied cannot reach the master flip-flop due to the input gates and therefore cannot influence the state of the output signals Q and $\overline{Q}$, respectively, while at the instant at which the clock signal T passes to the other state, the input gates are opened and the master flip-flop may trigger in accordance with the signals supplied, the state of the master flip-flop being passed on to the slave flip-flop when the clock signals returns to the said first state. The J- and K-information must therefore be present before the said instant, while if the master flip-flop triggers at this instant, further variations of the J- or K-signal cannot influence the state of the master flip-flop.

However, a disadvantage is that if the master flip-flop does not trigger at this instant and the J- and K-signals are O at the said instant, a triggering of either the J- or the K-signal or the appearance of an interference pulse during the said other state of the clock signal T may as yet cause the master flip-flop to trigger again, whereupon further variations of the J- or K-signal or the disappearance of the interference pulse during this "other" state of the clock signal cannot influence or restore the state of the master flip-flop.

In the JK-flip-flop according to the invention, variations of the J- or K-signals supplied cannot influence either the state of the master flip-flop during the first state of the clock signal T due to the input gates. However, the said disadvantage is mitigated by the specific construction of these input gates.

If due to the state of the clock signal T ( referred to above as the "other" state), the current sources are operative at the collectors of the transistors $T_4$, $T_5$ and $T_4'$, $T_5'$, respectively, a forward current will be applied to the base of the transistor $T_2'$, (arithmetical 1) but no current to the base of the transistor $T_2$ (arithmetical 0) only if either the K-signal is O (i.e. the transistors $T_3$ and $T_5'$ are nonconducting) and the Q-signal is 1 and hence the $\overline{Q}$-signal is 0 (i.e. the transistors $T_4$ and $T_6$ are conducting, $T_4'$ and $T_6'$ are nonconducting) or the Q-signal is 0 and hence the Q-signal is 1 and the J-signal is 1 (i.e. the transistors $T_4$, $T_6$, $T_4'$ and $T_5'$ are nonconducting, $T_5$, $T_3'$ and ' are conducting); in all other cases, in the same state of the clock signal T, a forward current will be applied to the base of the transistor s$T_2$ but no current to the base of the transistor $T_2'$.

Therefore, according to the principle of the invention, during the aforesaid "other" state of the clock signal, the master flip-flop is constantly capable of reading in new J- and K-information, respectively. The state of the master flip-flop corresponding to the information available just before the clock signal T returns to the "first" state, will be passed on to the slave flip-flop due to this variation of the clock signal. Thus, a JK-flip-flop is obtained which operates in a reliable manner and at a very high speed and which is further insensitive to the flank steepness of the pulses applied to it.

FIG. 2 shows a further development of the circuit arrangement of FIG. 1. The circuit elements of FIG. 1 are provided in FIG. 2 with the same reference numerals and fulfill analogous functions: the master flip-flop $T_1$–$T_1'$–$T_2$–$T_2'$ is again controlled from the gate circuits G and G', respectively, to which J-, K-, Q- and $\overline{Q}$-signals are applied in the manner described with reference to FIG. 1. The clock signal T is applied through transistors $T_7$ and $T_8$ to the collectors of the transistors $T_4$, $T_5$, $T_4'$ and $T_5'$. The resistors $R_1$–$R_3$ and $R_1'$–$R_3'$ prevent undesired coupling and feedback effects. Due to this mode of arrangement, the sources of the J- and K-signals as well as of the clock signal T are loaded only slightly and with a low energy consumption.

The slave flip-flop is constituted by the transistors $T_9$–$T_{13}$ and $T_9'$–$T_{13}'$ which are connected as a bistable flip-flop due to the cross-connections between the Q-output and the base of the transistor $T_{11}'$ through the transistors $T_9'$ and $T_{10}'$ and between the $\overline{Q}$-output and the base of the transistor $T_{11}$ through the transistors $T_9$ and $T_{10}$. The state of this slave flip-flop is determined by the outputs of the normally cut off transistors $T_{14}$ and $T_{14}'$, respectively, the bases of which are connected through the transistors $T_{15}$–$T_{17}$ to the clock signal T. The bases of all the PNP-transistors shown are connected to suitably chosen tappings on the supply voltage source so that a satisfactory operation of the circuit arrangement independent of the flank steepness of the signals applied is ensured. In the "other" state of the clock signal T, the transistors $T_{15}$, $T_{16}$ and $T_{17}$ are conducting and consequently the transistors $T_{14}$ and $T_{14}'$ are cut off. When the clock signal T passes to the "first" state, the transistors, transistors $T_{15}$–pulses $T_{17}$ are cut off so that one of the transistors $T_{14}$ and $T_{14}'$ becomes conducting and transfers the position of the master flip-flop $T_1$–$T_1'$–$T_2$–$T_2'$ to the base of one of the transistors $T_{11}$ and $T_{11}'$ so that the slave flip-flop takes over the position of the master flip-flop. Thus, the effects described with reference to FIG. 1 are practically achieved. Set pulses S and reset pulses S', respectively, are applied on the one hand to the master flip-flop $T_1$–$T_1'$–$T_2$–$T_2'$ and on the other hand to the slave flip-flop $T_9$–$T_{13}$, $T_9'$–$T_{13}'$ and permit the master flip-flop and the slave flip-flop to be adjusted independently of the J-, K- and T-signals. As a matter of course, both the circuit arrangement of FIG. 2 and the circuit arrangement which will be described below with reference to FIG. 3 are constructed in practice as integrated circuits.

In the alternative embodiment of FIG. 3, the gate circuits G and G' and the slave flip-flop are constructed in quite the same manner and are provided with the same reference numerals as in FIG. 2. The master flip-flop is slightly modified, that is to say that the cross-connections include diodes $D_1$ and $D_1'$ the pass directions of which correspond to the base-emitter pass directions of the transistors $T_1$ and $T_1'$, respectively, while the transistors $T_2$ and $T_2'$ of FIG. 2 are dispensed with, whereas transistors $T_{18}$ and $T_{18}'$, respectively, are added, the collector-emitter path of the transistor $T_{18}$ being connected between the collector of the transistor $T_1'$ on the one hand and the collectors of the transistors $T_4$ and $T_5$ on the other hand and the collector-emitter path of the transistor $T_{18}'$ between the collector of the transistor $T_1$ on the one hand and the collectors of the transistors $T_4'$ and $T_5'$ on the other hand. Furthermore, the emitter of the transistor $T_8$ arranged in the manner shown in FIG. 2 is connected to the bases of the transistors $T_{18}$ and $T_{18}'$. During the "other" state of the clock signal T, the transistors $T_7$ and $T_8$ and hence also one of the transistors $T_{18}$ and $T_{18}'$ are conducting so that a conductive connection is established between the outputs of each of the gate circuits G and G' and the master flip-flop $T_1$–$T_1'$, as a result of which the master flip-flop can always be adjusted in accordance with the output signals of these gate circuits G and G', respectively. When the clock signal T passes to the "first" state, the transistors $T_7$, $T_8$, $T_{18}$, and $T_{18}'$ will become nonconducting and the position then occupied by the master flip-flop $T_1$–$T'$ is then transferred through the transistors $T_{14}$ and $T_{14}'$ to the slave flip-flop.

What is claimed is:

1. A JK-flip-flop, comprising a master flip-flop, a slave flip-flop, intermediate gate means for connecting the output of the master flip-flop to the input of the slave flip-flop in response to a zero signal from a clock input terminal, first input gate means having an output terminal and a plurality of input terminals, second input gate means having an output terminal and a plurality of input terminals, means for connecting both J and K input signals to input terminals of the first input gate means, means for connecting a Q output terminal of the slave flip-flop to an input terminal of the first input gate means, means for connecting a $\overline{Q}$ output of the slave flip-flop to an input terminal of the second input gate means, means for connecting both J and K input signals to input terminals of the second input gate means, the first and input gate means each comprising means for establishing connections between each of the J and K inputs and the master flip-flop in response to a one-clock pulse signal and for the entire duration of the one-clock pulse signal.

2. A JK-flip-flop as claimed in claim 1, wherein said first input gate means comprises the first partial gate means for receiving the K and Q signals and a second partial gate for receiving the J and Q signals, the first and second partial gates having a common connection point for receiving a clock pulse input signal, the first and second partial gates comprising means for providing a one-output signal to a first input terminal of the master flip-flop in response to the concurrence of a one signal on the clock input terminal and either one signals on both the K and Q input terminals or 0 signals on the J and Q input terminals and for providing a O signal to the first input terminal of the master flip-flop in response to the concurrence of a 1 signal on the clock pulse input terminal and either a O input on the K input terminal and a 1 signal on the Q input terminal or a O input on the Q input terminal and a 1 input on the J input terminal, the second input gate means comprising a third partial gate means for receiving the J and $\overline{Q}$ signals and a fourth partial gate means for receiving the K and $\overline{Q}$ signals, the third and fourth partial gates having a common connection point for receiving the clock input signals, the third and fourth partial gates comprising means for providing a 1 output signal to a second input terminal of the master flip-flop in response to the concurrence of a 1 input from the clock input signal and either 1 input on the J and $\overline{Q}$ input terminals or O inputs on the K and $\overline{Q}$ input terminals and for providing a O output signal to the second input terminal of the master flip-flop in response to the concurrence of a 1 input from the clock pulse and either a O signal on the J input and a 1 signal on the $\overline{Q}$ input or a O signal on the $\overline{Q}$ input and a 1 signal on the K input.

3. A JK-flip-flop as claimed in claim 1, wherein each input gate means comprises four transistors each having base, collector and emitter terminals, a first and second of the transistors having parallel connected base emitter paths, the third transistor of each input gate means having a collector terminal connected to the base terminal of the first transistor in the corresponding gate means, the collector of the fourth transistor in each input gate means connected to the base of the second transistor in the corresponding gate means, wherein the K signal is connected to the base terminal of the third transistor in the first input gate means and to the base of the second transistor in the second gate means, wherein the J signal is connected to the base of the second transistor in the first input gate means and to the third transistor in the second input gate means, wherein the Q signal is connected to the base terminals of the first and fourth transistors in the first input gate means, and wherein the $\overline{Q}$ signal is connected to the base terminals of the first and fourth transistors in the second input gate means.

4. A JK-flip-flop as claimed in claim 3, further comprising a fifth transistor connected to the collectors of the first and second transistors in each input gate means for connecting the collectors of the first and second transistors to a source of supply in response to a 1 signal from the clock pulse input.

5. A JK-flip-flop as claimed in claim 3, further comprising a fifth transistor having base emitter and collector terminals, means for connecting the emitter terminal of the fifth transistor to the collector terminals of the first and second transistors in each of the input gate means, means for connecting the collector of the fifth transistor to a source of bias potential, means for connecting the base of the fifth transistor to the clock pulse input, a sixth transistor, and means for connecting the inverse of the clock pulses through the sixth transistor to the intermediate gate means for establishing a connection between the master flip-flop and slave flip-flop in response to the O clock pulse input.

PO-1050
(5/69)

UNITED STATES PATENT OFFICE
CERTIFICATE OF CORRECTION

Patent No. 3,603,819 Dated September 7, 1971

Inventor(s) NICOLAAS JOHANNES MARIA MOLLE

It is certified that error appears in the above-identified patent and that said Letters Patent are hereby corrected as shown below:

Col. 1, line 51, "se cone" should be --second--;

line 58, "signal is 0" first occurrence should be --signal is 1--;

Col. 2, line 6, "shown" should be --shows--;

line 15, cancel "-collector" second occurrence;

line 61, before "gates" insert --NOR--;

Col. 3, line 26, "$T_3'$ and '" should be --$T_3'$ and $T_6'$-- line 28, after "transistor" cancel "s";

line 69, cancel "transistors" second occurrence; cancel "pulses";

Col. 4, line 36, "$T_1$-T' " should be --$T_1$-$T_1'$--.

Signed and sealed this 18th day of April 1972.

(SEAL)
Attest:

EDWARD M.FLETCHER,JR.
Attesting Officer

ROBERT GOTTSCHALK
Commissioner of Patents